(12) United States Patent
Hwang (10) Patent No.: US 9,100,645 B2
(45) Date of Patent: Aug. 4, 2015

(54) PIXEL, STEREOPSIS DISPLAY DEVICE, AND DRIVING METHOD THEREOF

(75) Inventor: Young-In Hwang, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 921 days.

(21) Appl. No.: 13/137,975

(22) Filed: Sep. 22, 2011

(65) Prior Publication Data

US 2012/0139901 A1 Jun. 7, 2012

(30) Foreign Application Priority Data

Dec. 6, 2010 (KR) ........................ 10-2010-0123787

(51) Int. Cl.
*G06T 15/00* (2011.01)
*H04N 13/04* (2006.01)

(52) U.S. Cl.
CPC ....... *H04N 13/0438* (2013.01); *H04N 13/0497* (2013.01)

(58) Field of Classification Search
None
See application file for complete search history.

(56) References Cited

U.S. PATENT DOCUMENTS

| | | | |
|---|---|---|---|
| 7,176,912 B2 * | 2/2007 | Kota et al. | 345/211 |
| 7,420,551 B2 * | 9/2008 | Kota et al. | 345/211 |
| 8,773,518 B2 * | 7/2014 | Kato et al. | 348/55 |
| 2002/0089496 A1 * | 7/2002 | Numao | 345/204 |
| 2007/0128583 A1 * | 6/2007 | Miyazawa | 434/433 |
| 2008/0191977 A1 * | 8/2008 | Park et al. | 345/82 |
| 2008/0259063 A1 * | 10/2008 | Kim et al. | 345/204 |

FOREIGN PATENT DOCUMENTS

| | | |
|---|---|---|
| KR | 10 2005-0005646 A | 1/2005 |
| KR | 10 2008-0095799 A | 10/2008 |
| KR | 10 2008-0114169 A | 12/2008 |
| KR | 10 2010-0090954 A | 8/2010 |

OTHER PUBLICATIONS

Lee et al., "Novel Simultaneous Emission Driving Scheme for Crosstalk-free 3D AMOLED TV", SID Symposium Digest of Technical Papers, vol. 41, Issue 1, pp. 758-761, May 2010.*

Kang et al., "An optical feedback compensation circuit with a-Si:H thin-film transistors for active matrix organic light emitting diodes", Journal of Non-Crystalline Solids, vol. 354, Issues 19-25, May 1, 2008, pp. 2523-2528.*

Matsueda et al., "2.5-in MMOLED with Integrated 6-Bit Gamma Compensated Digital Data Driver", SID Symposium Digest of Technical Papers, vol. 35, Issue 1, May 2004, pp. 1116-1119.*

* cited by examiner

*Primary Examiner* — Dave Czekaj
*Assistant Examiner* — Mohammad J Rahman
(74) *Attorney, Agent, or Firm* — Lee & Morse, P.C.

(57) ABSTRACT

The stereopsis display device comprises: a scan driver, transmitting a plurality of scan signals to a plurality of scan lines; a gate driver, transmitting a plurality of gate signals to a plurality of gate lines; a data driver, transmitting a plurality of data signals to a plurality of data lines; a controller controlling the scan driver, the gate driver, and the data driver, generating image data signals corresponding to a left-eye image period and a right-eye image period respectively, during one frame, and supplying them to the data driver; and a display unit, including a plurality of pixels, connected to a corresponding scan line, among the plurality of scan lines, the plurality of gate lines, and a corresponding data line, among the plurality of data lines.

34 Claims, 7 Drawing Sheets

PIXEL, STEREOPSIS DISPLAY DEVICE, AND DRIVING METHOD THEREOF

RELATED APPLICATION

This application claims priority to and the benefit of Korean Patent Application No. 10-2010-0123787 filed in the Korean Intellectual Property Office on Dec. 6, 2010, the entire contents of which are incorporated herein by reference.

BACKGROUND

1. Field

Embodiments relate to a device, displaying a stereoscopic image and a driving method thereof. More particularly, embodiments relate to a pixel circuit of a display unit included in a stereopsis display device. Also, embodiments relate to a driving method realizing a stereoscopic image with low frequency by operation thereof.

2. Description of the Related Art

Various flat panel displays have been developed that are capable of reducing weight and volume. Weight and volume are disadvantages of a cathode ray tube. In flat panel displays, there are a liquid crystal display (LCD), a field emission display (FED), a plasma display panel (PDP), an organic light emitting diode (OLED) display, etc.

Among flat panel displays, the organic light emitting diode display, which displays images by using an organic light emitting diode (OLED) that generates light by recombining electrons and holes, has a fast response speed, is driven with low power consumption, and has excellent emission efficiency, luminance, and viewing angle.

The above disclosed information in the Background is only for enhancing an understanding of the described technology. Therefore, it may contain information that does not form the prior art that is already known to a person of ordinary skill in the art in this country.

SUMMARY

Present embodiments may be directed to a driving method and a driving method thereof.

A stereopsis display device, according to an exemplary embodiment may include: a scan driver, transmitting a plurality of scan signals to a plurality of scan lines; a gate driver, transmitting a plurality of gate signals to a plurality of gate lines; a data driver, transmitting a plurality of data signals to a plurality of data lines; a controller controlling the scan driver, the gate driver, and the data driver, generating image data signals corresponding to a left-eye image period and a right-eye image period respectively, during one frame, and supplying them to the data driver; and a display unit including a plurality of pixels, connected to a corresponding scan line, among the plurality of scan lines, the plurality of gate lines, and a corresponding data line among the plurality of data lines, wherein the plurality of pixels simultaneously emit light according to the image data signal of a viewpoint of the corresponding image period during the left-eye image period and the right-eye image period, and the plurality of pixels sequentially write the image data signal of a viewpoint, opposite to a viewpoint of the corresponding image period, during the left-eye image period or the right-eye image period.

The plurality of pixels may sequentially write the right eye image data signal while being simultaneously light-emitted according to the left eye image data signal during the left-eye image period.

The plurality of pixels may sequentially write the left eye image data signal while being simultaneously light-emitting according to the right eye image data signal, during the right-eye image period.

Each pixel of the plurality of pixels may include a first capacitor, maintaining the data voltage corresponding to the image data signal of the viewpoint, opposite to the viewpoint of each period.

The plurality of pixels may be sequentially initialized by a first initialization voltage, before the image data signal of the viewpoint, opposite to the viewpoint of each period, is sequentially written.

Each pixel of the plurality of pixels may include a first capacitor, maintaining the data voltage corresponding to the image data signal, and the first capacitor may be initialized by a first initialization voltage.

Each pixel of the plurality of pixels may include a second capacitor, simultaneously receiving and maintaining the data voltage, corresponding to the image data signal of the viewpoint, opposite to the viewpoint of each period sequentially written.

The second capacitor, of the plurality of pixels, may be simultaneously initialized by the initialization voltage, before receiving the data voltage.

The second initialization voltage may be more than a voltage level turning off the light emitting of the organic light emitting diode (OLED), included in each pixel of the plurality of pixels.

Each pixel of the plurality of pixels may include a first capacitor, sequentially receiving and maintaining the data voltage corresponding to the image data signal of the viewpoint, opposite to the viewpoint of each period, and a second capacitor, simultaneously receiving and maintaining the data voltage, wherein the first capacitor is sequentially initialized by the first initialization voltage, before receiving the data voltage, the second capacitor is simultaneously initialized by the second initialization voltage, before receiving the data voltage, and the first initialization voltage is lower than the second initialization voltage.

One terminal of the first capacitor may be connected to a power supply line, applying first and second initialization voltages.

The plurality of pixels may be connected to a first scan line, corresponding to the corresponding pixel line, and a second scan line, corresponding to the previous pixel line of the corresponding pixel line, and may receive a first scan signal through the first scan line and a second scan signal through the second scan line.

The plurality of gate lines may include two gate lines, and the plurality of pixels may receive two gate signals through the two gate lines.

The scan driver may transmit the plurality of scan signals to the plurality of pixels of the display unit, and a driving frequency of the plurality of scan signals may be equal to or less than a sub-frame frequency of the left-eye image period or the right-eye image period. The driving frequency of the scan signal may be the same as the sub-frame frequency that is half of one frame such that the sufficient driving speed may be obtained.

A pixel, according to an exemplary embodiment, may include: an organic light emitting diode (OLED); a driving transistor, transmitting a driving current according to a left eye image data signal or a right eye image data signal, to the organic light emitting diode (OLED); a switching transistor, transmitting a data voltage according to the left eye image data signal or the right eye image data signal, in response to a first scan signal; a first transistor being connected to the switching transistor, and transmitting the data voltage to a first node; a first capacitor, maintaining the data voltage applied to the first node; a second transistor, transmitting the data voltage applied to the first node, to the second node in response to the first gate signal; and a second capacitor, maintaining the data voltage transmitted to the second node, wherein the first capacitor maintains the data voltage, and the second transistor is in a turn-off state during a left-eye image period or a right-eye image period of one frame, in which the organic light emitting diode (OLED) emits light by the driving current, and the data voltage corresponds to the image data signal of the viewpoint, opposite to the viewpoint of each period, and is sequentially applied to the first node by passing through the switching transistor and the first transistor.

The driving transistor may include a gate, connected to the second node, a source, connected to a power supply line, supplying a first power source voltage, and a drain, connected to an anode of the organic light emitting diode (OLED).

The switching transistor may include a gate connected to the scan line transmitting the first scan signal, the source connected to the data line supplying the left eye image data signal or the right eye image data signal, and the drain connected to the source of the first transistor.

The first transistor may include a gate connected to the first node, the source connected to the drain of the switching transistor, and the drain connected to the first node.

The first capacitor may include one electrode connected to the first node and the other electrode connected to a power supply line, supplying the first power source voltage or an initialization voltage.

The second transistor may include a gate connected to the gate line transmitting the first gate signal, the source connected to the first node, and the drain connected to the second node.

The second capacitor may include one electrode connected to the second node and the other electrode connected to the power supply line, supplying the first power source voltage.

The driving transistor and the first transistor may have the same transistor characteristic. The driving transistor and the first transistor may have the same threshold voltage.

The data voltage, maintained by the first capacitor, may be transmitted from the first node to the second node when the second transistor is turned on, and the organic light emitting diode (OLED) emits light with the driving current, according to the data voltage maintained by the second capacitor.

The voltage level, lower than the initialization voltage, applied to the first node, may be applied to the other terminal of the first capacitor, when the second transistor is turned on.

The pixel may further include a third transistor transmitting the first initialization voltage to the first node, in response to the second scan signal to initialize the first capacitor, and a fourth transistor transmitting a second initialization voltage to the second node, in response to the second gate signal to initialize the driving transistor connected to the second node.

The second initialization voltage may be higher than the first initialization voltage, and the second initialization voltage may be more than a voltage level turning off the light emitting of the organic light emitting diode (OLED).

The second scan signal may be transmitted through the scan line, corresponding to the previous pixel line of the corresponding pixel line of the pixel.

The transistor of the pixel may be a PMOS transistor or an NMOS transistor, and may be realized by a transistor of one kind.

A driving method of a stereopsis display device, including a plurality of pixels connected to two corresponding scan lines of a plurality of scan lines, first and second gate lines, a data line of a plurality of data lines, and a power supply line according to an exemplary embodiment, and the plurality of pixels simultaneously emit light according to image data signals corresponding to a first viewpoint image period and a second viewpoint image period during one frame, the method may include: initializing, sequentially, each pixel of the plurality of pixels in response to a scan signal applied to the previous pixel line of the corresponding pixel line; receiving, sequentially, the data voltage corresponding to the image data signal of the viewpoint, opposite to the viewpoint of the image simultaneously emitted in each pixel of the plurality of pixels, in response to a scan signal applied to the corresponding pixel line in each pixel of the plurality of pixels; initializing, simultaneously, the driving transistor of each pixel of the plurality of pixels in response to the first gate signal applied to the first gate line; and transmitting, simultaneously, the received data voltage of each pixel of the plurality of pixels to the driving transistor, in response to a second gate signal applied to the second gate line, and simultaneously emitting light with the driving current according to the data voltage.

During the first viewpoint image period or the second viewpoint image period, the data voltage, corresponding to the second viewpoint image data signal or the first viewpoint image data signal, may be programmed in the receiving step of the data voltage.

The voltage sequentially initializing each pixel of the plurality of pixels may be lower than the voltage simultaneously initializing the driving transistor of each pixel of the plurality of pixels.

The voltage, simultaneously initializing the driving transistor of each pixel of the plurality of pixels, may be more than a voltage level turning off an organic light emitting diode (OLED) included in each pixel of the plurality of pixels.

DETAILED DESCRIPTION

Korean Patent Application No. 10-2010-0123787, filed on Dec. 6, 2010, in the Korean Intellectual Property Office, and entitled "Pixel, Stereopsis Display Device, and Driving Method Thereof," is incorporated by reference herein in its entirety.

The inventive concept will now be described more fully hereinafter with reference to the accompanying drawings, in which exemplary embodiments of the inventive concept are illustrated. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

Further, in the exemplary embodiments, like reference numerals designate like elements throughout the specification representatively in a first exemplary embodiment, and only elements other than those of the first exemplary embodiment will be described for subsequent embodiments.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Figure 1:
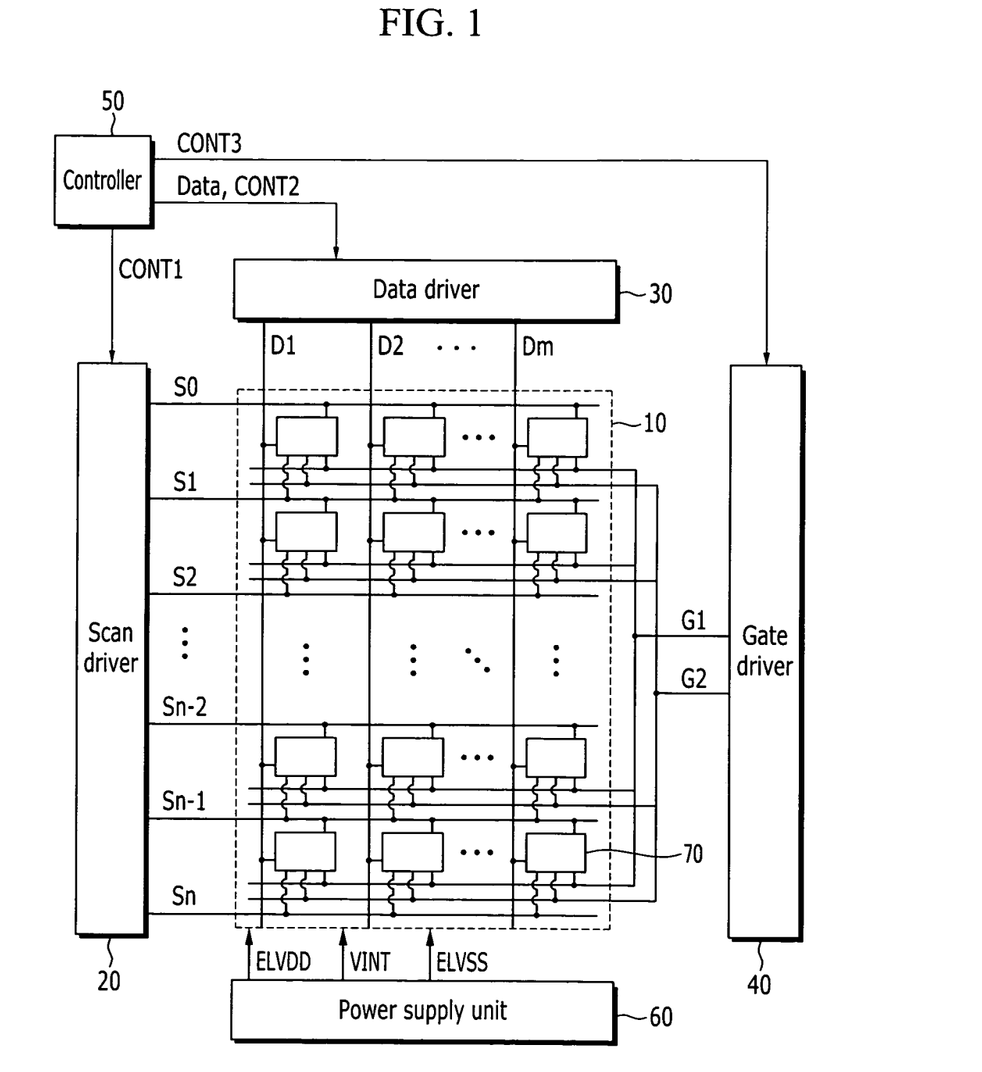
FIG. 1 is a block diagram of a stereopsis display device according to an exemplary embodiment.

FIG. 1 is a block diagram of a stereopsis display device according to an exemplary embodiment.

Referring to FIG. 1, a stereopsis display device, according to an exemplary embodiment, includes: a display unit 10 including a plurality of pixels 70 connected to scan lines S0 to Sn, data lines D1 to Dm, and gate lines G1 and G2; a scan driver 20 generating and supplying a scan signal to the scan lines S0 to Sn; a data driver 30 supplying image data signals according to video signals input from the outside to the data lines D1 to Dm; a gate driver 40 generating and supplying gate signals to the gate lines G1 and G2; a controller 50 controlling the scan driver 20, the data driver 30, and the gate driver 40; and a power supply unit 60 supplying the first power source voltage ELVDD, the second power source voltage ELVSS, and an initialization voltage VINT to each pixel of the display unit 10.

The plurality of pixels included in the display unit 10 may be arranged in a matrix, the plurality of pixels arranged in one line in a transverse direction form one pixel line, and the plurality of pixels arranged in one line in a longitudinal direction form one pixel column.

The plurality of pixel lines are connected to the scan line corresponding to the corresponding pixel line and the scan line corresponding to the previous pixel line among the scan lines S0 to Sn. For example, a plurality of pixels included in the n-th pixel line are connected to the n-th scan line Sn corresponding to the n-th pixel line and the (n−1)-th scan line Sn−1 corresponding to the (n−1)-th pixel line as the previous pixel line. The plurality of pixels included in the first pixel line are connected to the first scan line S1 and a dummy scan line S0.

The plurality of pixel lines are all connected to the first gate line G1 and the second gate line G2.

The plurality of pixel columns are connected to the corresponding data line among the data lines D1 to Dm.

The plurality of pixels receive the driving signals through the scan lines S0 to Sn and the gate lines G1 and G2 to be operated, and emit light with a driving current of a corresponding data voltage level by receiving the data signal according to the image data signal through the data lines D1 to Dm. The image data signal is the left eye image data signal or the right eye image data signal.

The controller 50 generates image data signals Data and various control signals from the signals supplied from the outside, i.e., a vertical synchronization signal, a horizontal synchronization signal, a clock signal, and a video signal.

The controller 50 generates and transmits a scan driving control signal CONT1 to the scan driver 20, a data driving control signal CONT2 to the data driver 30, and a gate driving control signal CONT3 to the gate driver 40.

The stereopsis display device, according to an exemplary embodiment, sequentially displays the left-eye image and the right-eye image, corresponding to both eyes, to display the stereoscopic image. To transmit the left-eye image and the right-eye image to both eyes, an additional set of shutter spectacles is required.

The viewer must wear the spectacles for the image to be projected during the period in which the left-eye image is displayed to only the left eye and for the image to be projected during the period in which the right-eye image is displayed to only the right eye.

The controller 50 converts the video signal supplied from the outside to generate the image data signal Data of the left eye image data signal and the right eye image data signal for realizing the 3D image. The left eye image data signal is the image data signal for the image to be transmitted to the left eye of the user and is recognized though a left eye glass (a left eye unit) of the shutter spectacles. The right eye image data signal is the image data signal for the image to be transmitted to the right eye of the user, and is recognized though a right eye glass (a right eye unit) of the shutter spectacles.

The image data signal Data is transmitted to the data driver 30.

The data driver 30 supplies a plurality of image data signals to a plurality of data lines DA1 to DAm at the sub-frame, corresponding to the left-eye image display period and the right-eye image display period, among a plurality of sub-frames included in one frame.

The data driver 30 supplies a plurality of left eye image data signals and a plurality of right eye image data signals to the plurality of data lines, according to the data driving control signal CONT2 transmitted from the controller 50.

The data driver 30 transmits the plurality of image data signals to a plurality of data lines, to a plurality of pixels, synchronized with a viewpoint at which the scan signal having the gate on voltage, corresponding to each sub-frame, is supplied to be activated. The gate on voltage means the level for turning on the switching transistor for the image data signal to be transmitted to the gate electrode of the driving transistor. The driving transistor transmits the driving current to the organic light emitting diode (OLED) included in the pixel.

The plurality of corresponding left eye image data signals are transmitted through the plurality of data lines at the left-eye image display period. The plurality of corresponding right eye image data signals are transmitted at the right-eye image display period.

The controller 50 transmits the scan driving control signal CONT controlling the operation of the scan driver 20. The scan driver 20 generates and supplies a plurality of scan signals to the corresponding scan line among the plurality of scan lines S0 to Sn corresponding thereto. The initial transmission viewpoint of the plurality of scan signals is synchronized with the transmission viewpoint of the vertical synchronization signal transmitted through the controller 50.

When the scan signal transmitted to the corresponding scan line among a plurality of scan lines S0 to Sn has the gate on voltage, the plurality of pixels connected to the scan line are selected and activated. The plurality of pixels selected by the scan signal are supplied with the left eye image data signal or the right eye image data signal from the plurality of data lines D1 to Dm.

The driving frequency of the plurality of scan signals transmitted to the entire plurality of pixels of the display unit 10 is controlled by the scan driving control signal CONT1. The scan driver 20 supplies the plurality of scan signals by the sub-frame unit with the driving speed according to the scan driving control signal CONT1. In the driving method of the stereopsis display device of present embodiments, one frame is divided, and driven as two sub-frames, i.e., the left-eye image period and the right-eye image period. Thus, the driving speed at which the plurality of scan signals are transmitted, may be obtained at a low speed.

The controller 50 transmits the gate driving control signal CONT3 controlling the operation of the gate driver 40. The gate driver 40 generates a plurality of gate signals including the first gate signal and the second gate signal, and transmits them to the first gate line G1 and the second gate line G2.

The first gate line G1 and the second gate line G2 are both connected to all pixels of the display unit 10 such that all pixels may be simultaneously operated corresponding to the first gate signal and the second gate signal transmitted from the first gate line G1 and the second gate line G2.

Figure 2:
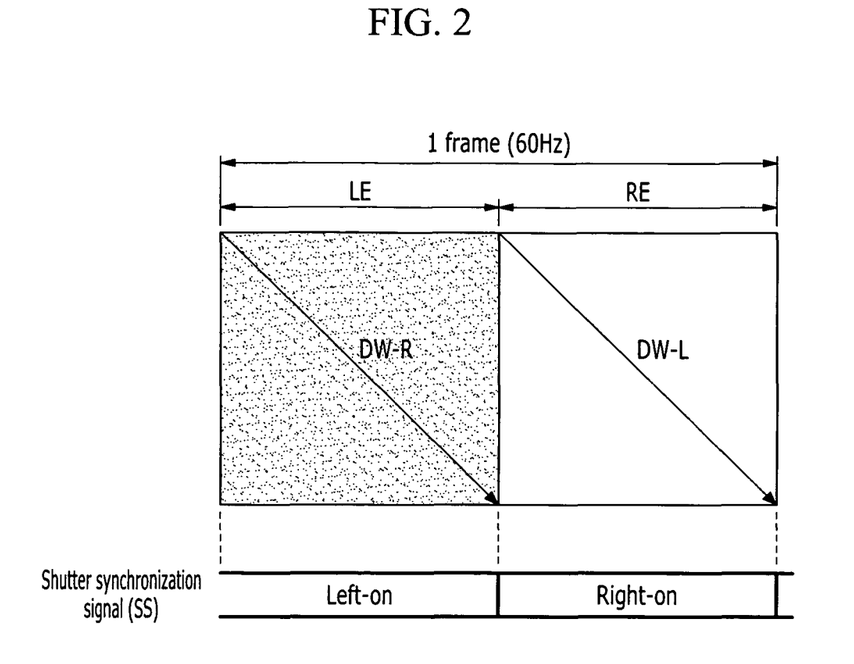
FIG. 2 is a frame schematic diagram showing a driving method of the stereopsis display device of FIG. 1.

FIG. 2 is a frame schematic diagram showing a driving method of the stereopsis display device shown in FIG. 1.

The driving method of the stereopsis display device according to an exemplary embodiment, divides one frame into two sub-frames of the left-eye image period LE and the right-eye image period RE. One frame is driven at 60 Hz, and each sub-frame is driven at 120 Hz. In the conventional stereoscopic image display method, after each image display period is finished, the period for displaying the black image is inserted, such that the driving frequency of the image display period is increased. However, according to the driving method of present embodiments, the driving frequency of each image period may be low.

In an exemplary embodiment, the left-eye image period LE is the period in which the pixel emits light with the driving current corresponding to the left eye image data signal such that the left-eye image is displayed. Each pixel simultaneously writes the right eye image data signal while displaying the left-eye image. The left-eye image period LE for displaying the left-eye image through the plurality of pixels of the display unit 10 simultaneously becomes a right eye data writing period DW-R in which the right eye image data signal is written.

After the left-eye image period LE is finished, the plurality of pixels of the display unit 10 emit the light with the driving current corresponding to the right eye image data signal transmitted to the right eye data writing period DW-R to display the right-eye image. The period in which the right-eye image is displayed is the right-eye image period RE. A plurality of pixels, displaying the right-eye image and the left eye image data signal, are simultaneously written during the right-eye image period RE, in which the right-eye image is displayed. The right-eye image period RE, in which the plurality of pixels of the display unit 10 display the right-eye image, simultaneously becomes the left eye data writing period DW-L in which the left eye image data signal is written.

The plurality of frames are connected such that the left-eye image or the right-eye image is alternately and repeatedly displayed. Simultaneously, the image data signal of the viewpoint opposite to the corresponding viewpoint is written. The right and left images are not sequentially written, but alternately. The right and left images simultaneously emit light one time, such that the right-eye image and the left-eye image may be divided without the insertion of the black image. The image data signal of the viewpoint opposite to the viewpoint corresponding to the light emitting image is written throughout the period, while simultaneously emitting the light, such that the driving frequency may be sufficiently low.

The left eye shutter of the spectacles is opened by the shutter synchronization signal SS during the left-eye image period LE of FIG. 2. The left-on left-eye image is recognized by the left eye. The right eye shutter of the spectacles is opened by the shutter synchronization signal SS during the right-eye image period RE. The right-on right-eye image is recognized by the right eye.

Figure 3:
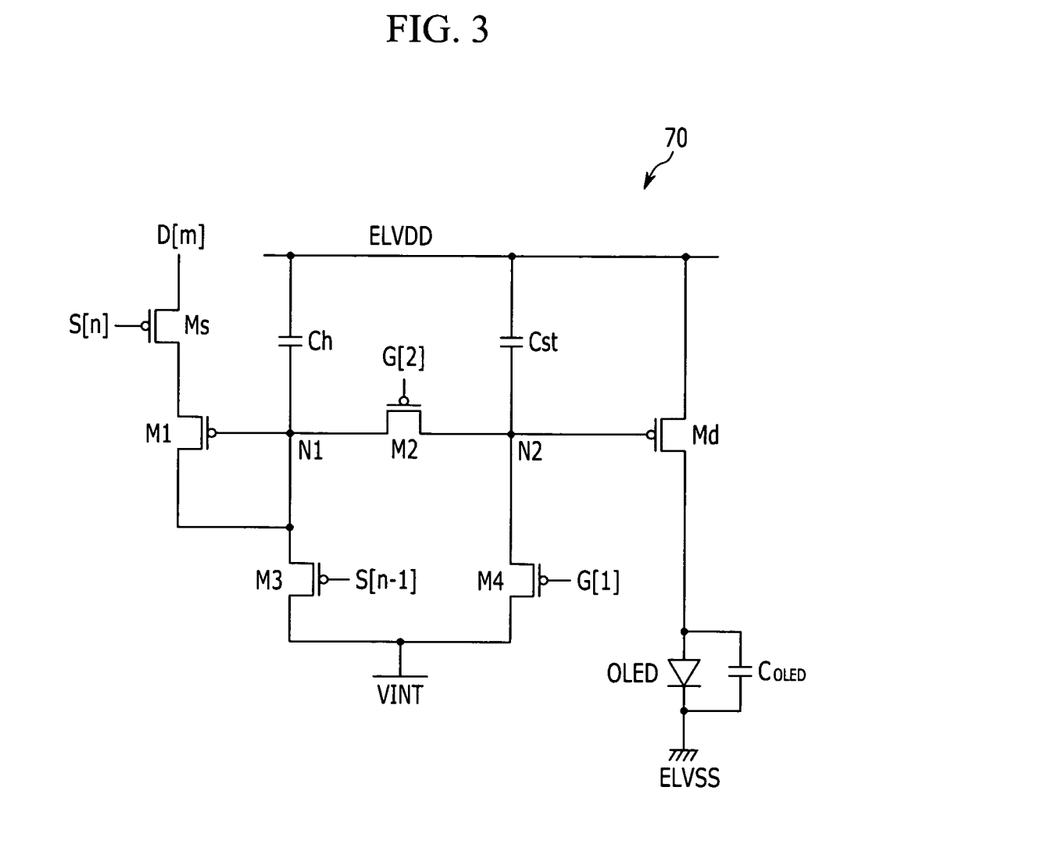
FIG. 3 is a circuit diagram showing an exemplary embodiment of a pixel circuit in the stereopsis display device shown in FIG. 1.

FIG. 3 is a circuit diagram of a pixel 70, included in the display unit 10 of the stereopsis display device, according to an exemplary embodiment. The pixel 70 is the pixel connected to the m-th data line, among the plurality of pixels, included in the n-th pixel line.

The pixel 70 of FIG. 3 includes six transistors Md, Ms, and M1 to M4, two capacitors Ch and Cst, and an organic light emitting diode (OLED). A capacitor $C_{OLED}$ connected between electrodes of the organic light emitting diode (OLED), is not described.

The pixel 70 includes the organic light emitting diode (OLED) emitting the light corresponding to the driving current according to the image data signal, a switching transistor MS switching the data signal D[m] applied to the m-th data line of the plurality of data lines in response to the scan signal S[n] applied to the n-th scan line of the plurality of scan lines, a driving transistor Md supplying the driving current to the organic light emitting diode (OLED) corresponding to the data voltage according to the image data signal input to the gate, and a storage capacitor Cst storing the data signal applied to the gate of the driving transistor Md.

The pixel 70 further includes a first transistor M1 applying the data voltage according to the data signal D[m] transmitted to the switching transistor MS to the first node N1. The first transistor M1 is connected to the driving transistor Md as a mirror type, and the first transistor M1 and the driving transistor Md have transistor characteristics such as a threshold voltage.

The pixel 70 further includes a hold capacitor Ch maintaining the voltage level according to the data signal applied to the first node N1.

The pixel 70 further includes a second transistor M2 transmitting the data voltage according to the data signal D[m] transmitted to the first node N1 to the second node N2.

The pixel 70 further includes a third transistor M3 transmitting an initialization voltage VINT to the first node N1 in response to the scan signal S[n−1] applied to the (n−1)-th scan line as the n-th previous scan line among a plurality of scan lines. The fourth transistor M4 transmits the initialization voltage VINT to the second node N2 in response to the first gate signal G[1] applied to the first gate line.

A connection of a plurality of transistors and capacitors forming the pixel 70 will be described.

The switching transistor MS includes the gate connected to the n-th scan line and receiving the scan signal S[n], the source connected to the m-th data line and receiving the corresponding data signal D[m], and the drain connected to the source of the first transistor M1.

The first transistor M1 includes the gate connected to the first node N1, the source connected to the drain of the switching transistor MS, and the drain connected to the source of the third transistor M3. The first transistor M1 is connected to the driving transistor Md as the mirror type via the second transistor M2, interposed therebetween.

The second transistor M2, transmitting the voltage of the first node N1 to the second node N2 in response to the second gate signal G[2] transmitted through the second gate line, is positioned between the driving transistor Md and the first transistor M1.

The second transistor M2 includes the gate connected to the second gate line, the source connected to the first node N1, and the drain connected to the second node N2.

The third transistor M3 includes the gate connected to the (n−1)-th scan line to receive the corresponding scan signal S[n−1], the source connected to the first node N1, and the drain connected to the power source voltage line from the power supply unit 60 to receive the initialization voltage VINT.

The fourth transistor M4 includes the gate connected to the first gate line to receive the first gate signal G[1], the source connected to the second node N2, and the drain connected to the power source voltage line from the power supply unit 60 to be applied with the initialization voltage VINT.

The voltage levels of the initialization voltage VINT applied to each drain of the third transistor M3 and the fourth transistor M4 may be different.

The pixel 70 includes the hold capacitor Ch maintaining the voltage applied to the first node N1 during a predetermined period, and the capacitor Cst maintaining the voltage applied to the second node N2 during a predetermined period.

The hold capacitor Ch includes one terminal connected to the first node N1 and the other terminal connected to the power source voltage line from the power supply unit 60 to receive the first power source voltage ELVDD.

The storage capacitor Cst includes one terminal connected to the second node N2 and the other terminal connected to the power source voltage line from the power supply unit 60 to receive the first power source voltage ELVDD.

The organic light emitting diode (OLED) included in the pixel 70 includes an anode connected to the drain of the driving transistor Md and a cathode connected to the power source voltage line applying the second power source voltage ELVSS, or that is grounded.

Figure 4:
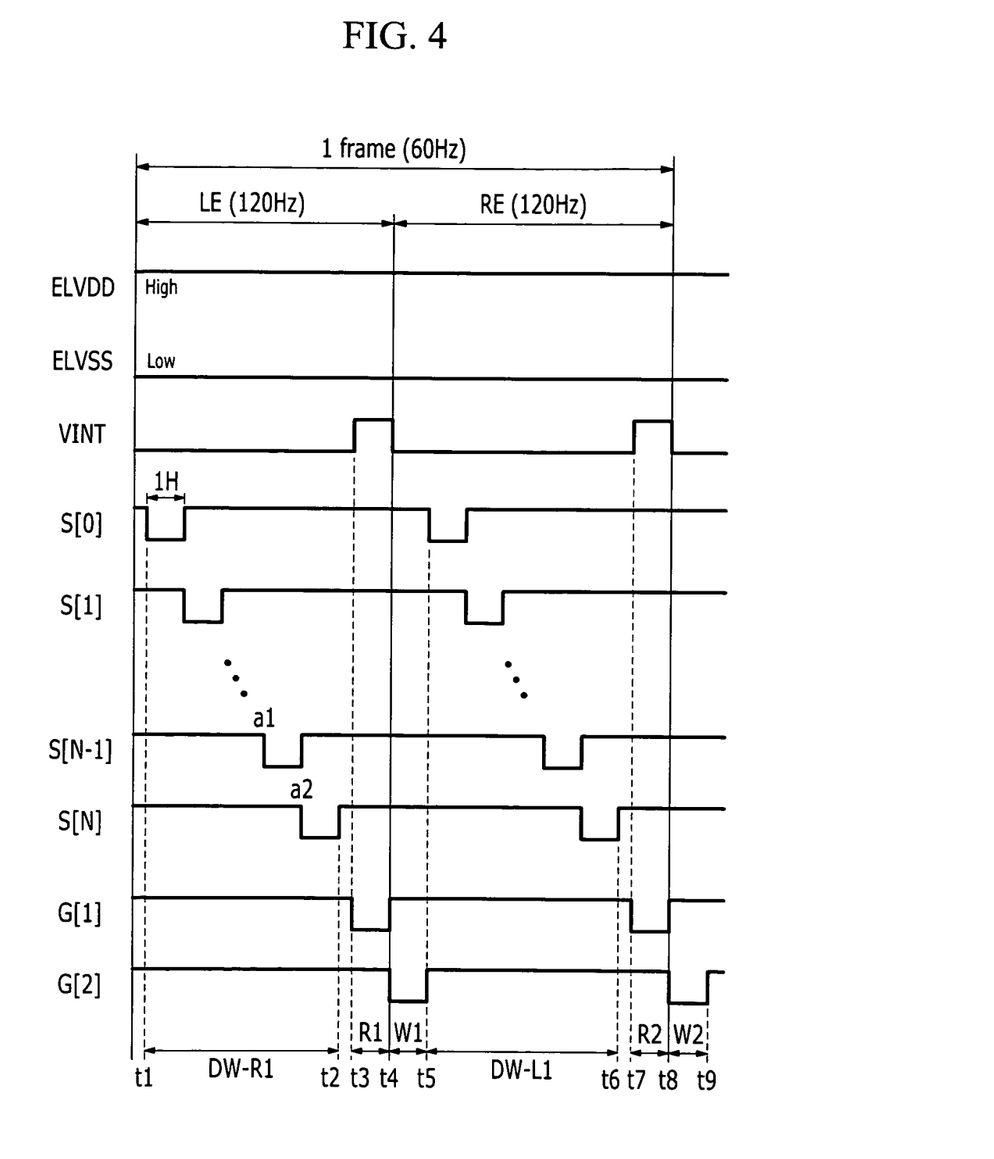
FIG. 4 is a driving waveform of an operation of a pixel shown in FIG. 3.

The transistors forming the pixel shown in FIG. 4 are not limited by type, however they may be realized by PMOS or NMOS transistors.

A process in which the pixel 70 of present embodiments is operated according to the driving of the stereopsis display device will be described with reference to a driving waveform diagram of FIG. 4.

Referring to FIG. 4, one frame is driven with the driving frequency of 60 Hz, and includes two sub-frames. The two sub-frames are the left-eye image period LE displaying the left-eye image and the right-eye image period RE displaying the right-eye image. One sub-frame is driven with the driving frequency of 120 Hz.

The first power source voltage ELVDD and the second power source voltage ELVSS applied through the power supply unit 60 maintain the corresponding voltage level during 1 frame. The first power source voltage ELVDD is maintained with the high potential voltage during 1 frame, and the second power source voltage ELVSS is maintained with the low potential voltage of the lower level than the first power source voltage ELVDD during 1 frame.

The driving process of the stereopsis display device according to an exemplary embodiment, is the same in the case of the left-eye image and the right-eye image, such that only the left-eye image period will be described.

In the left-eye image period LE, as the period in which all pixels emit the light according to the left eye image data signal to display the image, the left eye image data signal is already written to the plurality of pixels in the previous frame and the left eye image data voltage corresponding thereto is stored. Then, all pixels simultaneously emit light.

Referring to FIG. 4, a plurality of scan signals S[0] to S[n] are sequentially transmitted through the scan lines connected to the plurality of pixels of the display unit 10 at the beginning of the left-eye image period LE. The plurality of pixels are simultaneously connected to the scan line corresponding to the corresponding pixel line and the previous scan line. Accordingly, the pixels are sequentially activated corresponding to the two scan signals transmitted with the gate on voltage level though the scan line connected to the pixel. For example, a plurality of pixels included in the first pixel line receive the scan signals S[0] and S[1] are activated, and the scan signals are sequentially transmitted to the plurality of pixels included in the final pixel line.

The transistors forming the pixel 70, according to the exemplary embodiment shown in FIG. 3, are the PMOS type, such that the voltage level, turning on the gate of the transistor, is a low level.

Accordingly, among the left-eye image period LE in which the plurality of pixels of the display unit 10 display the left-eye image, transmitting the scan signal S[0] having the voltage of the low level to the first pixel line at the viewpoint t1 is started and the scan signal S[n] having the voltage of the low level is sequentially transmitted to the final n-th pixel line at the viewpoint t2.

The initialization voltage VINT transmitted to the plurality of pixels during the period from the viewpoint t1 to the viewpoint t2 is not limited to the predetermined voltage. However, it is maintained as a low level for turning on the transistor, included in the plurality of pixels.

The pixel 70 shown in FIG. 3 is the pixel connected to the m-th data line, among the plurality of pixels, included in the n-th pixel line such that it is connected to the scan lines Sn and Sn−1. Thus, the scan signal S[n−1] at the viewpoint a1 and the scan signal S[n] at the viewpoint a2 are transmitted with the gate on voltage.

The third transistor M3 of the pixel 7 is turned on by the scan signal S[n−1] transmitted at the viewpoint a1, such that the initialization voltage VINT is transmitted to the first node N1. The storing voltage of the hold capacitor Ch, connected to the first node N1, is initialized to the predetermined initialization voltage VINT. The first transistor M1, having the gate electrode connected to the first node N1, is turned on by the initialization voltage VINT of the low level, transmitted to the first node N1.

The switching transistor MS is turned on by the scan signal S[n] transmitted at the viewpoint a2. The corresponding data signal D[m] is transmitted through the m-th data line connected to the pixel 70. The period in which this process is executed as the left-eye image period LE is when the pixels of the display unit 10 display the left-eye image, and the transmitted data signal D[m] corresponds to the right eye image data signal.

The right eye data signal D[m] passes by the switching transistor MS, passes through the turned-on first transistor M1 at the viewpoint a1, and is again transmitted to the first node N1. Thus, voltage Vdata[m]−Vthm1, of which the threshold voltage Vthm1 of the first transistor M1 is subtracted from the data voltage Vdata[m] according to the right eye data signal D[m], is applied to one terminal of the hold capacitor Ch. The voltage Vdata[m]−Vthm1 is maintained as the voltage of the first node N1 during a predetermined period.

This above-described process is related to the pixel 70, included in the n-th pixel line, among a plurality of pixels included in the display unit 10. A plurality of pixels, included in a plurality of pixel lines, sequential executes this process during the viewpoint t1 to the viewpoint t2. Thus, the voltage, according to the corresponding right eye data signals is stored to each hold capacitor. Accordingly, the period from the viewpoint t1 to the viewpoint t2 corresponds to the right eye data writing period DW-R1 in which the right eye data signals are written to the plurality of pixels.

The initialization voltage VINT, transmitted to all pixels included in the display unit 10, is increased to the high level at the viewpoint t3. Furthermore, the first gate signal G[1], transmitted through the first gate line connected to all pixels, is transmitted as the gate on voltage level.

Referring to the pixel 70 of FIG. 3, the fourth transistor M4 is turned on by the first gate signal G[1] transmitted as the gate on voltage level during the period R1 from the viewpoint t3. The initialization voltage VINT, transited into the high level through the fourth transistor M4, is transmitted to the second node N2. The initialization voltage VINT, transited into the high level, initializes the driving transistor Md connected to the second node N2. The initialization voltage VINT is a sufficiently high voltage such that the light emitting of the organic light emitting diode (OLED) connected to the drain of the driving transistor Md may be blocked.

This process started at the viewpoint t3 and generated while the period R1 is simultaneously executed for all pixels included in the display unit 10. Thus, it may be considered that the driving transistors Md of all pixels are simultaneously initialized.

The driving transistors Md of all pixels are transmitted to the initialization voltage VINT of the high level during the period R1, to turn off the driving transistor Md. The light emitting of the organic light emitting diode (OLED) is prevented, such that it may be considered that the period R1 is a black period.

The second gate signal G[2], transmitted through the second gate line, connected to all pixels, is transmitted as the gate on voltage level at the viewpoint t4. The second gate signal G[2], of the low level, is transmitted to the gate electrode of the second transistor M2 of all pixels.

The voltage of the first node N1, sequentially written during the right-eye image writing period DW-R1, and maintained by the hold capacitors Ch of all pixels is changed into the voltage corresponding to the second node N2 through the turned-on second transistor M2. The right eye data voltage, corresponding to the right eye data signal, applied to the second node N2 is determined according to the capacity ratio of the hold capacitor Ch and the storage capacitor Cst. The storage capacitor Cst, having one terminal connected to the second node N2, maintains the right eye data voltage distributed to the second node N2.

The driving transistor Md flows the driving current according to the right eye data voltage that is maintained and stored through the storage capacitor Cst and emits the organic light emitting diode (OLED). Accordingly, the organic light emitting diode (OLED) of the plurality of pixels emitting from the viewpoint t4 display the right-eye image according to the right eye image data signal.

Tt may be considered that the period W1, started at the viewpoint t4 as the right eye data writing period for the driving transistor Md because the voltage of the first node N1 maintained by the hold capacitors Ch of all pixels is transmitted to the second node N2 and is again stored as the corresponding voltage by the storage capacitors Cst. Compared with the hold capacitor Ch, of all pixels being sequentially initialized during the right eye data writing period DW-R1, and the voltage, corresponding to the right eye data signal being sequentially written to the hold capacitor Ch, the driving transistor Md is simultaneously initialized during the period R1. The corresponding right eye data voltages written to the hold capacitors Ch, during the period W1, are simultaneously written to the storage capacitors Cst of all pixels. The right eye data voltage, transmitted to the second node N2, connected to one terminal of the storage capacitor Cst, is determined according to the capacity ratio between two capacitors. The two capacitors are the hold capacitor Ch and the storage capacitor Cst.

The light emitting is executed with the voltages, according to the right eye data signals respectively written to the storage capacitors Cst from the period W1. Thus, the right-eye image period RE is started.

As an exemplary embodiment, the right eye data voltage maintained by the storage capacitor Cst and transmitted to the second node N2 in the pixel is changed according to the capacitance of the hold capacitor Ch and the storage capacitor Cst. If the ratio of the capacitance H-cap of the hold capacitor Ch and the capacitance S-cap of the storage capacitor Cst is 2:1, the effective data voltage Veff, according to the data signal that is actually compensated, may be represented as Equation 1 below:

$$Veff = \frac{(2(Vdata[m] - Vthm1) + VINT)}{3} \quad \text{Equation 1}$$

A process like the above-described series process is experienced during the right-eye image period RE, in which the corresponding data voltage is written according to the right eye image data signal, and the organic light emitting diode (OLED) emits the light with the driving current. The scan signal is sequentially transmitted to the plurality of pixels during the left eye data writing period DW-L1, started at the viewpoint t5 among the right-eye image period RE, such that the hold capacitor Ch is initialized. Then, the voltages corresponding to the left eye data voltages, according to the left eye data signals, are respectively stored to the hold capacitors Ch.

After the sequential left eye data writing period DW-L1 has passed, the initialization voltage VINT is increased to the high level, during the period R2, from the viewpoint t7. The first gate signal G[1] of the gate on voltage level is simultaneously transmitted to the plurality of pixels to initialize the plurality of pixels. The second gate signal G[2], of the gate on voltage level, is simultaneously transmitted to the plurality of pixels during the period W2 from the viewpoint t8, such that the voltage corresponding to the left eye data voltage stored to the hold capacitor Ch, is stored to the storage capacitor Cst. The left-eye image starts to be emitted. The initialization is simultaneously executed for the driving transistors Md of the plurality of pixels during the period R2 and the period W2. The data writing for the driving transistor Md is simultaneously executed.

One new frame is started at the viewpoint t8, at which the left-eye image is light-emitted.

Figure 5:
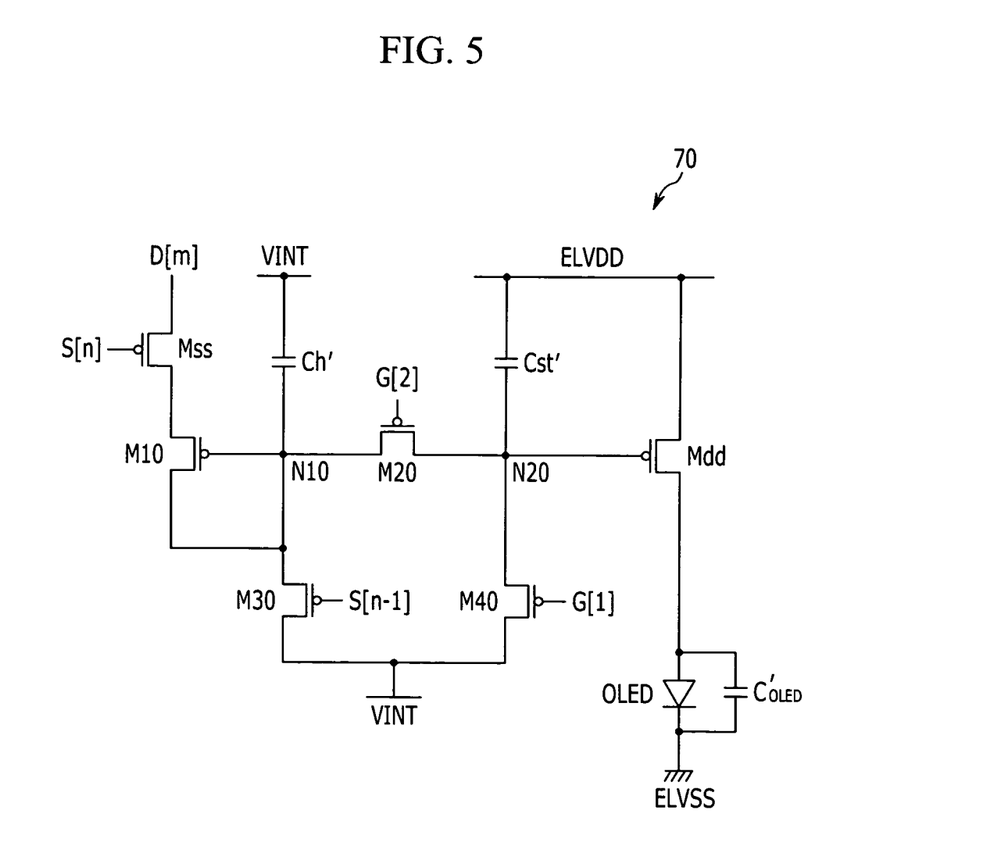
FIG. 5 is a circuit diagram showing another exemplary embodiment of a pixel circuit in the stereopsis display device shown in FIG. 1.
Figure 6:
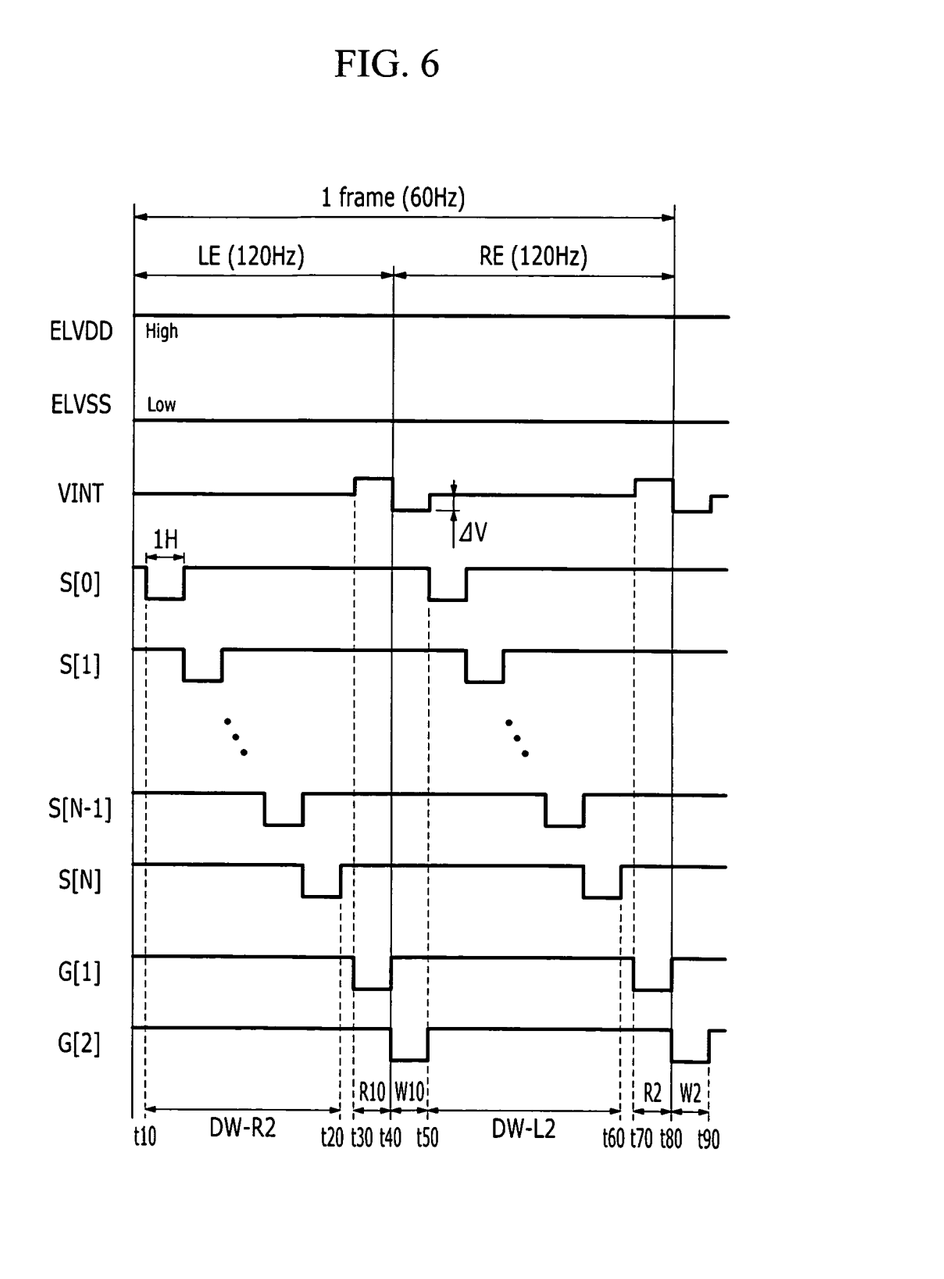
FIG. 6 is a driving waveform of an operation of a pixel shown in FIG. 5.

FIG. 5 is a circuit diagram showing a pixel circuit in the stereopsis display device, according to another exemplary embodiment, shown in FIG. 1. FIG. 6 is a driving waveform of an operation of a pixel shown in FIG. 5. The structure of the pixel 70 shown in FIG. 5 and FIG. 6 and the driving method thereof, are similar to those of FIG. 3 and FIG. 4. Only the differences will be described.

The driving method, according to an exemplary embodiment, of FIG. 5 and FIG. 6 is a driving method for increasing the light emitting luminance in a case in which the capacitance of the hold capacitor Ch' is not sufficiently large. This is similar to the exemplary embodiment of FIG. 3 and FIG. 4, in which the ratio of the capacitance of the hold capacitor Ch' and the capacitance of the storage capacitor Ch' is compared.

In the structure of the pixel 70, of the exemplary embodiment, according to FIG. 5, one terminal of the hold capacitor Ch' is connected to the first node N10. The other terminal thereof is connected to the power source voltage line from the power supply unit 60, thereby receiving the initialization voltage VINT. This is different from FIG. 3, in which the other terminal of the hold capacitor Ch' of the pixel 70 receives the first power source voltage ELVDD. Referring to the driving waveform of FIG. 6, the initialization voltage VINT, sequentially transmitted to each hold capacitor Ch' of a plurality of pixels during the right eye data writing period DW-R2 for initializing the storing voltage of the hold capacitor Ch', is a voltage level lower than the first power source voltage ELVDD. Accordingly, the voltage stored to the hold capacitor Ch', having the capacitance that is not sufficiently large, may be decreased.

Different from FIG. 4, the exemplary embodiment of FIG. 6 shows the process driven by the pixel 70 of FIG. 5 to change a voltage grade of the initialization voltage VINT. In the exemplary embodiment of FIG. 6, the voltage grade of the initialization voltage VINT, during the right eye data writing period DW-R2 or the left eye data writing period DW-L2, is a middle degree between the first power source voltage ELVDD of the high level and the second power source voltage ELVSS of the low level.

When the initialization voltage VINT, of the middle level, is transmitted to the other terminal of each hold capacitor Ch' of a plurality of pixels, the initialization voltage VINT is sequentially applied to one terminal of each hold capacitor Ch' of the plurality of pixels by the scan signal transmitted through the previous pixel line. Thus, each hold capacitor Ch' of the plurality of pixels stores the low voltage and is initialized.

The data voltage, according to the data signal of the corresponding viewpoint, is transmitted to the first node N10 connected to one terminal of the hold capacitor Ch' by the scan signal that is sequentially transmitted through the corresponding pixel line directly after the initialization for each hold capacitor Ch' of the plurality of pixels is finished. Accordingly, the voltage of the first node N10, maintained by the hold capacitor Ch', is the voltage Vdata[m]−Vthm10. The threshold voltage Vthm10 of the first transistor M10 is subtracted from the voltage Vdata[m] of the data signal.

After the data writing period DW-R2 is passed for each hold capacitor Ch' of a plurality of pixels, the first gate signal G[1] is transmitted to the fourth transistor M40 of all pixels at the viewpoint t30. Simultaneously, the initialization voltage VINT is increased to the high level. Accordingly, the initialization voltage VINT of the high level is transmitted to the second node N20 by the turn-on of the fourth transistor M40, such that the driving transistor Mdd, of all pixels, is simultaneously initialized.

The second gate signal G[2] is transmitted to the second transistor M20 of all pixels at the viewpoint t40. Simultaneously, the initialization voltage VINT is decreased to the low level. Accordingly, the data voltage written to the first node N10 by the turn-on of the second transistor M20 is transmitted to the second node N20, such that the data is simultaneously written for the driving transistor Mdd of all pixels. The initialization voltage VINT that is decreased to the low level, is the voltage that is lower than the initialization voltage during the period DW-R2. The period DW-R2 is when the data voltage is written to the hold capacitor Ch' by ΔV. Thus, the voltage of the second node N20 is determined according to the voltage of which the voltage ΔV is distributed, according to the capacity ratio between the hold capacitor Ch' and the storage capacitor Cst'. The effective data voltage transmitted to the gate node of the driving transistor Mdd, i.e., the second node, may be represented as Equation 2:

$$Veff = \frac{(2(Vdata[m] - Vthm10 - V1) + VINT)}{3} \quad \text{Equation 2}$$

Here, V1 is an amount that the voltage of the second node N20 is decreased. The voltage of the second node N20 is decreased by the voltage of which the voltage ΔV is distributed according to the capacity ratio of two capacitors, i.e., the hold capacitor Ch' and the storage capacitor Cst'.

When comparing the effective data voltage by Equation 2 with the exemplary embodiment of FIG. 4, the data voltage is decreased by V1 such that the voltage difference Vgs, between the gate and the source of the driving transistor Mdd is further increased. Thus, more driving current may flow. Although sufficient capacity of the hold capacitor Ch' is not formed, the luminance may be sufficiently increased through the level adjustment of the initialization voltage, such that a clear stereoscopic image of high luminance may be displayed.

Likewise, in the stereopsis display device, according to the exemplary embodiment of FIG. 5 and FIG. 6, the process in which the frames are repeated while the display unit simultaneously emits the left-eye image and the right-eye image to form one frame, and during the left eye or right-eye image period the data voltage corresponding to the data signal for the viewpoint opposite to the image of the corresponding viewpoint is sequentially written to the hold capacitor of each pixel and then is simultaneously written to the storage capacitor of each pixel for the light emitting, is the same as described above. Thus, the description thereof is omitted.

As shown in the waveform diagrams of FIG. 4 and FIG. 6, a plurality of pixels are sequentially scanned during each image period, bisecting one frame, to write the image data signal of the opposite viewpoint, such that the plurality of pixels may be driven at a relatively low frequency. Accordingly, the correct stereoscopic image may be displayed in a large size, and may be driven with a low frequency. Thus, the power consumption may be reduced.

In the conventional art, a plurality of pixels emitting light in the organic light emitting diode (OLED) display includes an organic light emitting diode (OLED). The organic light emitting diode (OLED) generates light of a predetermined luminance corresponding to a data current supplied from a pixel circuit.

Digital driving, as one method of grayscale expression of the conventional organic light emitting diode (OLED) display, controls the time that the organic light emitting diode (OLED) of the pixel is turned on. In the case of the organic light emitting diode (OLED) display according to digital driving, one frame is divided into a plurality of sub-frames. A light emitting period of each sub-frame is determined for the grayscale display. Among the plurality of sub-frames of one frame, the pixel emits light during a sub-frame. The sub-frame is selected according to a video signal for the grayscale expression.

To display a stereoscopic image, at least two images, corresponding to at least two different viewing points, must be displayed in the conventional art during one frame display period. A stereoscopic image display device displays a left-eye image and a right-eye image corresponding to two eyes, in one frame period.

The period of one frame in the conventional art is divided into a left-eye image period and a right-eye image period. The period includes a left-eye image display period, for displaying the left-eye image in the left-eye image period, and a right-eye image display period, for displaying the right-eye image in the right-eye image period.

According to a conventional technique of dividing one frame into a plurality of sub-frames for 3D realization and a field sequential driving method, a scan method of the display panel is sequentially executed from an upper side to a lower side, and the speed of the scan driving may be significantly fast. When the left-eye image period and the right-eye image period include a black image display period for displaying a black image over the entire organic light emitting diode (OLED) display, the scanning speed for the realization of the 3D image is very fast, i.e., 240 Hz degree, to prevent crosstalk.

The time of the light emitting is reduced and the luminance is reduced by the insertion of the black image in the conventional art. Thus, luminance of more than several times must be obtained. Power consumption of general driving is increased to obtain the luminance.

In a large organic light emitting diode (OLED) display of the conventional art, if the driving frequency is high, an image display operation may be uncorrected in the display panel of the display device. The driving power consumption is generated by the increased high driving frequency of the driver of the display device. Thus, there is a cost increase of the stereopsis display device.

Figure 7:
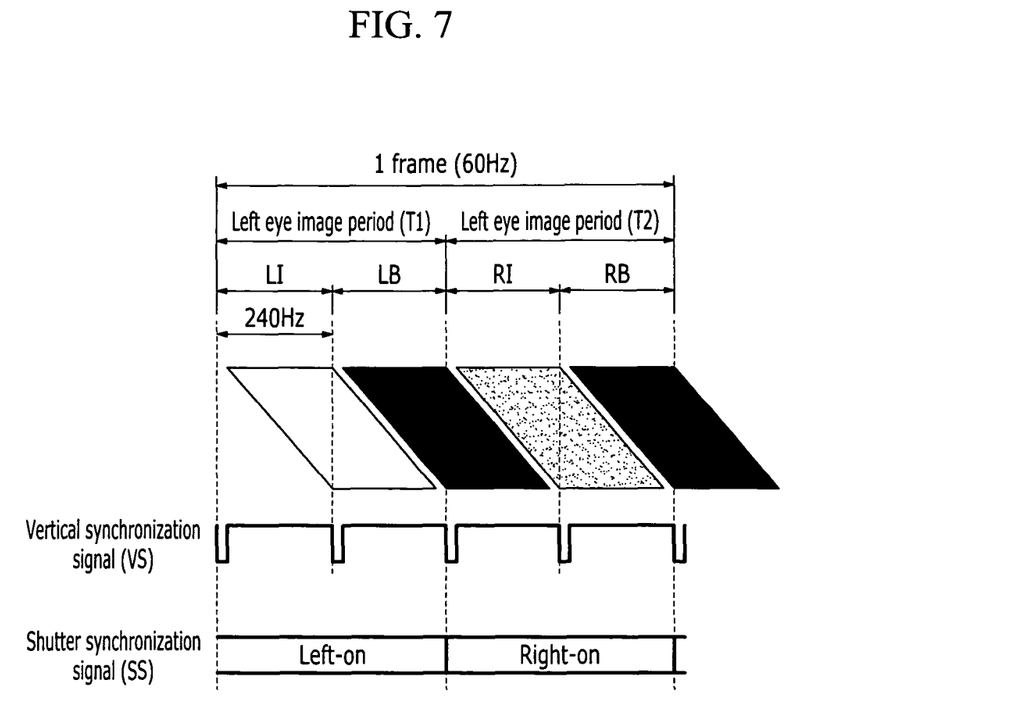
FIG. 7 is a frame diagram and a driving waveform showing a driving method of a stereopsis display device according to the conventional art.

FIG. 7 is a frame diagram and a driving waveform showing a driving method of a stereopsis display device according to the conventional art.

A realization method of a conventional 3D stereoscopic image that is realized during one frame, in a stereopsis display device, according to a field sequential driving method, is shown in FIG. 7.

According to FIG. 7, one frame may be driven at 60 Hz, among a 3D driving method of the conventional art. Each sub-frame may be driven at 240 Hz.

When 3D-driving a display panel of a sequential driving method of the conventional art, one frame is divided into a left-eye image period T1 and a right-eye image period T2. T1 and T2 are respectively divided into sub-frames of a corresponding image display period and a black image display period.

The left-eye image period T1 of the conventional art includes a left-eye image display period LI, displaying a left-eye image, and a black image display period LB, displaying a black image.

The right-eye image period T2 of the conventional art includes a right-eye image display period RI, displaying a right-eye image, and a black image display period RB, displaying the black image.

A sub-frame of the conventional art, displaying the black image, is inserted after the sub-frame displaying the left-eye image or the right-eye image, to clearly divide the left-eye image and the right-eye image, and to suppress crosstalk due to a mixture of the left-eye image and the right-eye image.

One frame in the conventional art is driven at 60 Hz, such that the left-eye image display period LI, the black image display period LB, the right-eye image display period RI, and the black image display period RB, forming one frame, are driven at 240 Hz.

A scan signal in the conventional art is sequentially transmitted to a plurality of pixels included in the display panel in each image display period. Data information, according to the image data signal, is written. A first scan signal, among the scan signal transmitted to the plurality of pixels, is synchronized with a vertical synchronization signal VS transmitted at an initialization of each image display period. Then, the scan signals are sequentially transmitted. The display panel of the stereopsis display device is scanned by a plurality of scan signals, synchronized with the vertical synchronization signal VS. The display of the stereopsis display device sequentially activates a plurality of pixel lines of the display panel.

In the conventional 3D stereoscopic image system, to realize the 3D stereoscopic image, stereoscopic image shutter spectacles are required to recognize the left-eye image and the right-eye image, corresponding to the display panel displaying the left-eye image and the right-eye image.

The shutter spectacles of the conventional art open the left eye corresponding to a shutter synchronization signal SS and simultaneously close the right eye in the left-eye image period T1. The shutter spectacles open the right eye, corresponding to the shutter synchronization signal SS, and simultaneously close the left eye in the right-eye image period T2.

Accordingly, the left-eye image in the conventional art is displayed at the left-eye image display period LI. The black image is displayed at the black image display period LB among the left-eye image period T1 in which the left eye is opened. Thus, the left-eye image and the black image are sequentially recognized by the opened left eye of the shutter spectacles.

Also, the right-eye image is displayed at the right-eye image display period LI. The black image is displayed at the black image display period RB among the right-eye image period T2 in which the right eye is opened. Thus, the right-eye image and the black image are sequentially recognized by the opened right eye of the shutter spectacles.

However, if the black image is inserted in the conventional art, for the division of the right and left images and the prevention of the crosstalk, each sub-frame is driven at the high driving speed of 240 Hz while one frame is driven at 60 Hz. Thus, it is difficult to display the correct image for the large sized display panel. Power consumption may be increased. The luminance is decreased by half due to the black image. A gray voltage is required to display the same luminance. Overall driving power consumption is increased. The conventional technique of inserting the black image may have a difficulty in completely dividing the right and left images.

Accordingly, it may be necessary to develop a pixel circuit for realizing 3D, that solves the luminance deterioration due to the black image at a low frequency. In addition, it may be necessary to improve a clear stereopsis display device of high image quality. Thus, the stereopis display may be improved in terms of power consumption, and may have a correct image display operation for the realization of a 3D stereoscopic image.

Present embodiments may be directed to a driving method, capable of reducing a luminance loss and improving power consumption in a stereopsis display device using a field sequential driving method. Present embodiments may provide a display device of a 3D stereoscopic image that is capable of preventing luminance deterioration due to insertion of a black image and displaying a correct and clear stereoscopic image in a large sized image display panel by changing a driving speed with low frequency, and a driving method.

According to present embodiments, the stereopsis display device displaying the stereoscopic image is driven with a low frequency such that the low luminance may be prevented and the power consumption for the image display may be reduced.

The scan period and the data writing period of the display panel may be sufficiently obtained. The correct expression of grayscales and a clear and stable 3D stereoscopic image may be realized in the stereopsis display device.

Exemplary embodiments of the inventive concept have been disclosed herein, and although specific terms are employed, they are to be used and are to be interpreted in a generic and descriptive sense only and not for purpose of limitation. Accordingly, it will be understood by those of ordinary skill in the art that various changes in form and details may be made without departing from the spirit and scope of the inventive concept as set forth in the following claims.

What is claimed is:

1. A stereopsis display device, comprising:
    a scan driver, transmitting a plurality of scan signals to a plurality of scan lines;
    a gate driver, transmitting a plurality of gate signals to a plurality of gate lines;
    a data driver, transmitting a plurality of data signals to a plurality of data lines;
    a controller controlling the scan driver, the gate driver, and the data driver, generating a first image data signal to be displayed for a first image period and a second image data signal to be displayed for a second image period respectively, during one frame, and supplying the first and second image data signals to the data driver; and
    a display unit, including a plurality of pixels to alternatively display the first image data signal and the second image data signal, the plurality of pixels connected to the plurality of scan lines, the plurality of gate lines, and the plurality of data lines, wherein:
    the plurality of pixels simultaneously emit light according to the first image data signal during the first image period, and the plurality of pixels sequentially write the second image data signal during the first image period, and
    the plurality of pixels simultaneously emit light according to the second image data signal during the second image period, and the plurality of pixels sequentially write a first image data signal of a next frame during the second image period.

2. The stereopsis display device as claimed in claim 1, wherein the plurality of pixels sequentially write the second image data signal while being simultaneously light-emitted according to the first image data signal during the first image period.

3. The stereopsis display device as claimed in claim 1, wherein:
    the plurality of pixels sequentially write the first image data signal while being simultaneously light-emitting according to the second image data signal during the second image period.

4. The stereopsis display device as claimed in claim 1, wherein the plurality of pixels includes a plurality of first capacitors, maintaining data voltages corresponding to the first image data signal during the second image period and maintaining data voltages corresponding to the second image data signal during the first image period.

5. The stereopsis display device as claimed in claim 1, wherein:
    the plurality of pixels are sequentially initialized by a first initialization voltage, before the first image data signal or the second image data signal is sequentially written.

6. The stereopsis display device as claimed in claim 5, wherein the plurality of pixels include a plurality of first capacitors maintaining data voltages corresponding to the first image data signal or data voltages corresponding to the second image data signal and being initialized by the first initialization voltage.

7. The stereopsis display device as claimed in claim 1, wherein the plurality of pixels include a plurality of second capacitors, simultaneously receiving and maintaining the data voltages corresponding to the first image data signal during the first image period, and simultaneously receiving and maintaining data voltages corresponding to the second image data signal during the second image period.

8. The stereopsis display device as claimed in claim 7, wherein the second capacitors, of the plurality of pixels, are simultaneously initialized by a second initialization voltage, before receiving the data voltages corresponding to the first image data signal or the second image data signal.

9. The stereopsis display device as claimed in claim 8, wherein:
    the second initialization voltage is more than a voltage level turning off the light emitting of the organic light emitting diode (OLED), included in each pixel of the plurality of pixels.

10. The stereopsis display device as claimed in claim 1, wherein the plurality of pixels includes:
    a plurality of first capacitors, sequentially receiving and maintaining the data voltages corresponding to the first image data signal during the second image period, and sequentially receiving and maintaining the data voltages corresponding to the second image data signal during the first image period, and
    a plurality of second capacitors, simultaneously receiving the data voltages corresponding to the first image data signal from corresponding first capacitors at a starting point of the first image period and maintaining the data voltages received from the corresponding first capacitors during the first image period and simultaneously receiving the data voltages corresponding to the second image data signal received from the corresponding first capacitors at a starting point of the second image period and maintaining the data voltages from the corresponding first capacitors during the second image period,
    wherein the first capacitors are sequentially initialized by a first initialization voltage, before receiving the data voltages corresponding to the first image data signal or the second image data signal, the second capacitors are simultaneously initialized by a second initialization voltage, before receiving the data voltages corresponding to the first image data signal or the second image data signal from the corresponding first capacitors, and the first initialization voltage is lower than the second initialization voltage.

11. The stereopsis display device as claimed in claim 10, wherein:
    one terminal of each of the first capacitors is connected to a power supply line applying first and second initialization voltages.

12. The stereopsis display device as claimed in claim 1, wherein
    each of the plurality of pixels is connected to a first scan line as a scan line corresponding to the each of the plurality of pixels and a second scan line as a scan line corresponding to a previous pixel of the each of the plurality of pixels and receives a first scan signal through the first scan line and a second scan signal through the second scan line.

13. The stereopsis display device as claimed in claim 1, wherein:
the plurality of gate lines include two gate lines, and
each pixel of the plurality of pixels receive two gate signals through the two gate lines.

14. The stereopsis display device as claimed in claim 1, wherein:
the scan driver transmits the plurality of scan signals to the plurality of pixels of the display unit, and a driving frequency of the plurality of scan signals is equal to or less than a sub-frame frequency of the first image period or the second image period.

15. A pixel, comprising:
an organic light emitting diode (OLED);
a driving transistor, transmitting a driving current corresponding to a left eye image data signal to be displayed for a left eye image period or a driving current corresponding to a right eye image data signal to be displayed for a right eye image period during one frame, to the organic light emitting diode (OLED);
a switching transistor, transmitting a data voltage corresponding to the left eye image data signal during the right eye image period or transmitting a data voltage corresponding to the right eye image data signal during the left eye image period, in response to a first scan signal;
a first transistor being connected to the switching transistor, and transmitting the data voltage corresponding to the left eye image data signal or the data voltage corresponding to the right eye image data to a first node;
a first capacitor, maintaining the data voltage applied to the first node;
a second transistor, transmitting the data voltage applied to the first node, to a second node in response to a first gate signal; and
a second capacitor, maintaining the data voltage transmitted to the second node,
wherein:
the first capacitor maintains the data voltage applied to the first node, when the second transistor is in a turn-off state,
the organic light emitting diode (OLED) emits light by the driving current corresponding to the left eye image data signal during the left eye image period, and the data voltage corresponds to a left image data signal of a next frame is applied to the first node by passing through the switching transistor and the first transistor during the right eye image period, and
the organic light emitting diode (OLED) emits light by the driving current corresponding to the right eye image data signal during the right eye image period, and the data voltage corresponding to a right image data signal of the next frame is applied to the first node by passing through the switching transistor and the first transistor during the left eye image period.

16. The pixel as claimed in claim 15, wherein the driving transistor includes:
a gate, connected to the second node, a source, connected to a power supply line, supplying a first power source voltage, and a drain, connected to an anode of the organic light emitting diode (OLED).

17. The pixel as claimed in claim 15, wherein the switching transistor includes:
a gate, connected to a scan line transmitting the first scan signal, a source, connected to a data line supplying the left eye image data signal or the right eye image data signal, and a drain, connected to a source of the first transistor.

18. The pixel as claimed in claim 15, wherein the first transistor includes:
a gate, connected to the first node, a source, connected to a drain of the switching transistor, and a drain, connected to the first node.

19. The pixel as claimed in claim 15, wherein the first capacitor includes:
one electrode connected to the first node, and another electrode connected to a power supply line supplying a first power source voltage or an initialization voltage.

20. The pixel as claimed in claim 15, wherein the second transistor includes:
a gate, connected to the gate line transmitting the first gate signal, a source, connected to the first node, and a drain, connected to the second node.

21. The pixel as claimed in claim 15, wherein the second capacitor includes:
one electrode connected to the second node, and another electrode connected to a power supply line supplying a first power source voltage.

22. The pixel as claimed in claim 15, wherein:
the driving transistor and the first transistor have the same transistor characteristic.

23. The pixel as claimed in claim 15, wherein:
the driving transistor and the first transistor have the same threshold voltage.

24. The pixel as claimed in claim 15, wherein:
the data voltage corresponding to the left eye image data signal or the right eye image data signal, maintained by the first capacitor, is transmitted from the first node to the second node when the second transistor is turned-on, and the organic light emitting diode (OLED) emits light with the driving current corresponding to the data voltage transmitted to the second capacitor.

25. The pixel as claimed in claim 24, wherein:
the voltage level, lower than a initialization voltage applied to the first node, is applied to a terminal of the first capacitor, when the second transistor is turned on.

26. The pixel as claimed in claim 15, further comprising:
a third transistor transmitting a first initialization voltage to the first node, in response to a second scan signal to initialize the first capacitor; and
a fourth transistor transmitting a second initialization voltage to the second node, in response to a second gate signal to initialize the driving transistor connected to the second node.

27. The pixel as claimed in claim 26, wherein:
the second initialization voltage is higher than the first initialization voltage.

28. The pixel as claimed in claim 26, wherein:
the second initialization voltage is more than a voltage level turning off the light emitting of the organic light emitting diode (OLED).

29. The pixel as claimed in claim 15, wherein:
the driving, switching, first, and second transistors of the pixel are a PMOS transistor or an NMOS transistor.

30. A driving method of a stereopsis display device, including a plurality of pixels including a plurality of driving transistors, each of the plurality of pixels connected to first and second scan lines, first and second gate lines, a corresponding data line of a plurality of data lines, and a power supply line, and the plurality of pixels simultaneously emit light according to a first image data signal to be displayed during a first viewpoint image period or according to a second image data signal to be displayed during a second viewpoint image period during one frame, the method comprising:
- initializing, sequentially, the plurality of pixels with a first initialization voltage in response to a first scan signal applied to the first scan line;
- receiving, sequentially, data voltages corresponding to the first image data signal during the second viewpoint image period and data voltages corresponding to the second image data signal during the first viewpoint image period in response to a second scan signal applied to the second scan line;
- initializing, simultaneously, the plurality of driving transistors of the plurality of pixels with a second initialization voltage in response to a first gate signal applied to the first gate line;
- transmitting, simultaneously, the data voltages corresponding to the first image data signal to the plurality of driving transistors in response to a second gate signal applied to the second gate line, and simultaneously emitting light with a driving current according to the data voltages corresponding to the first image data signal during the first viewpoint image period; and
- transmitting, simultaneously, the data voltages corresponding to the second image data signal to the plurality of driving transistors in response to the second gate signal applied to the second gate line, and simultaneously emitting light with a driving current according to the data voltages corresponding to the second image data signal during the second viewpoint image period.

31. The method as claimed in claim 30, wherein,
during the first viewpoint image period or the second viewpoint image period,
the data voltages, corresponding to the first viewpoint image data signal or the second viewpoint image data signal, are programmed in the receiving step of the data voltages.

32. The method as claimed in claim 30, wherein:
the first initialization voltage is lower than the second initialization voltage.

33. The method as claimed in claim 32, wherein:
the second initialization voltage is more than a voltage level turning off an organic light emitting diode (OLED) included in each pixel of the plurality of pixels.

34. The stereopsis display device as claimed in claim 1, wherein,
the first image period and the second image period have a sequential order during one frame.

* * * * *